United States Patent
Gupta

(10) Patent No.: US 8,543,156 B2
(45) Date of Patent: Sep. 24, 2013

(54) INTERFACE AUTHORIZATION SCHEME

(75) Inventor: Rajarshi Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/467,821

(22) Filed: May 9, 2012

(65) Prior Publication Data

US 2012/0220301 A1     Aug. 30, 2012

Related U.S. Application Data

(62) Division of application No. 12/643,681, filed on Dec. 21, 2009.

(60) Provisional application No. 61/141,585, filed on Dec. 30, 2008.

(51) Int. Cl.
    H04B 7/00     (2006.01)
(52) U.S. Cl.
    USPC ..... 455/525; 455/432.3; 455/434; 455/435.1; 455/436; 455/437; 709/217; 709/218; 709/219; 709/223; 709/224
(58) Field of Classification Search
    USPC ....... 455/432.3–446; 709/217–219, 223–229
    See application file for complete search history.

(56) References Cited

U.S. PATENT DOCUMENTS

| | | |
|---|---|---|
| 2007/0254620 A1 | 11/2007 | Lindqvist et al. |
| 2009/0070694 A1 | 3/2009 | Ore et al. |
| 2009/0132675 A1 | 5/2009 | Horn et al. |
| 2009/0161628 A1 | 6/2009 | Kubota et al. |
| 2009/0288145 A1 | 11/2009 | Huber et al. |
| 2010/0107225 A1* | 4/2010 | Spencer et al. ......... 726/4 |
| 2010/0169412 A1 | 7/2010 | Gupta |

FOREIGN PATENT DOCUMENTS

| | | |
|---|---|---|
| EP | 1775976 | 4/2007 |
| JP | 2006352371 A | 12/2006 |
| JP | 2007151090 A | 6/2007 |
| KR | 1020020059640 | 7/2002 |
| WO | WO0131843 | 5/2001 |
| WO | 2007083541 A1 | 7/2007 |
| WO | 2008148191 A2 | 12/2008 |

OTHER PUBLICATIONS

International Search Report and Written Opinion—PCT/US2009/069611, International Search Authority—European Patent Office—Aug. 13, 2010.
Taiwan Search Report—TW098144840—TIPO—Dec. 12, 2012.

* cited by examiner

*Primary Examiner* — Fayyaz Alam
(74) *Attorney, Agent, or Firm* — Nerrie M. Zohn

(57) ABSTRACT

An authorization scheme controls whether an interface is established between communication nodes. Such a scheme may be used, for example, to determine whether to establish a direct interface (e.g., an X2 interface) between a pair of access points. A decision to establish a direct interface between nodes may be based on a node type of one or both of the nodes. A decision to establish a direct interface between nodes may be based on whether the nodes belong to the same group.

34 Claims, 9 Drawing Sheets

INTERFACE AUTHORIZATION SCHEME

CLAIM OF PRIORITY

This application is a Divisional Application and claims the benefit of and priority to U.S. patent application Ser. No. 12/643,681, filed Dec. 21, 2009, entitled Interface Authorization Scheme which claims priority to U.S. Provisional Patent Application No. 61/141,585, filed Dec. 30, 2008.

BACKGROUND

1. Field

This application relates generally to communication and more specifically, but not exclusively, to authorization of the establishment of an interface between nodes.

2. Introduction

A wireless communication network is deployed over a defined geographical area to provide various types of services (e.g., voice, data, multimedia services, etc.) to users within that geographical area. In a typical implementation, macro access points (e.g., associated with different macro cells or sectors) are distributed throughout a network to provide wireless connectivity for access terminals (e.g., cell phones) that are operating within the geographical area served by the network. As the demand for high-rate and multimedia data services rapidly grows, there lies a challenge to implement efficient and robust communication networks with enhanced performance.

To supplement conventional macro access points (e.g., implemented as a NodeB or an evolved NodeB), small-coverage access points may be deployed to provide more robust wireless coverage to mobile units (e.g., within in a user's home). Such small-coverage access points may be known as, for example, Home NodeBs, Home eNodeBs, access point base stations, femto nodes, or femto cells. Typically, such small-coverage access points are connected to the Internet and the mobile operator's network via a DSL router or a cable modem.

In general, it is desirable for access points in a network to communicate directly with each other using an appropriate interface. For example, in a 3GPP LTE network, eNBs communicate directly with each other using an X2 interface. In cases where the interfaces are persistent, these interfaces require state maintenance.

In a heterogenous network that employs small-coverage access points, however, there may be a large number (e.g., hundreds or thousands) of small-coverage access points deployed within a cell or sector of a given macro access point. As it is considered undesirable to require a macro access point to maintain interfaces for a large number of small-coverage access points, direct interfaces have conventionally not been employed for these small-coverage access points.

SUMMARY

A summary of sample aspects of the disclosure follows. In the discussion herein, any reference to the term aspects may refer to one or more aspects of the disclosure.

The disclosure relates in some aspects to an authorization scheme for establishing interfaces between communication nodes. For example, such a scheme may be used to determine whether to establish a direct interface (e.g., an X2 interface) between a pair of access points.

In some aspects, a decision to establish a direct interface between nodes is based on a node type (e.g., class) of one or both of the nodes. In some implementations, different node types may comprise, for example, a macro access point type (or NodeB or eNodeB) or a femto access point type (e.g., Home NodeB or Home eNodeB). As one specific example, if the node that initiates a procedure to establish an interface is a femto access point and the other node is a macro access point, an interface may not be established. Conversely, an interface may be established for any other combination of macro and femto access points.

In some aspects, a decision to establish a direct interface between nodes is based on whether the nodes belong to the same group. For example, an interface may be established between nodes only if the nodes belong to the same closed subscriber group (CSG), belong to the same enterprise, or are under the same femto gateway.

BRIEF DESCRIPTION OF THE DRAWINGS

These and other sample aspects of the disclosure will be described in the detailed description and the appended claims that follow, and in the accompanying drawings, wherein:

Figure 1:
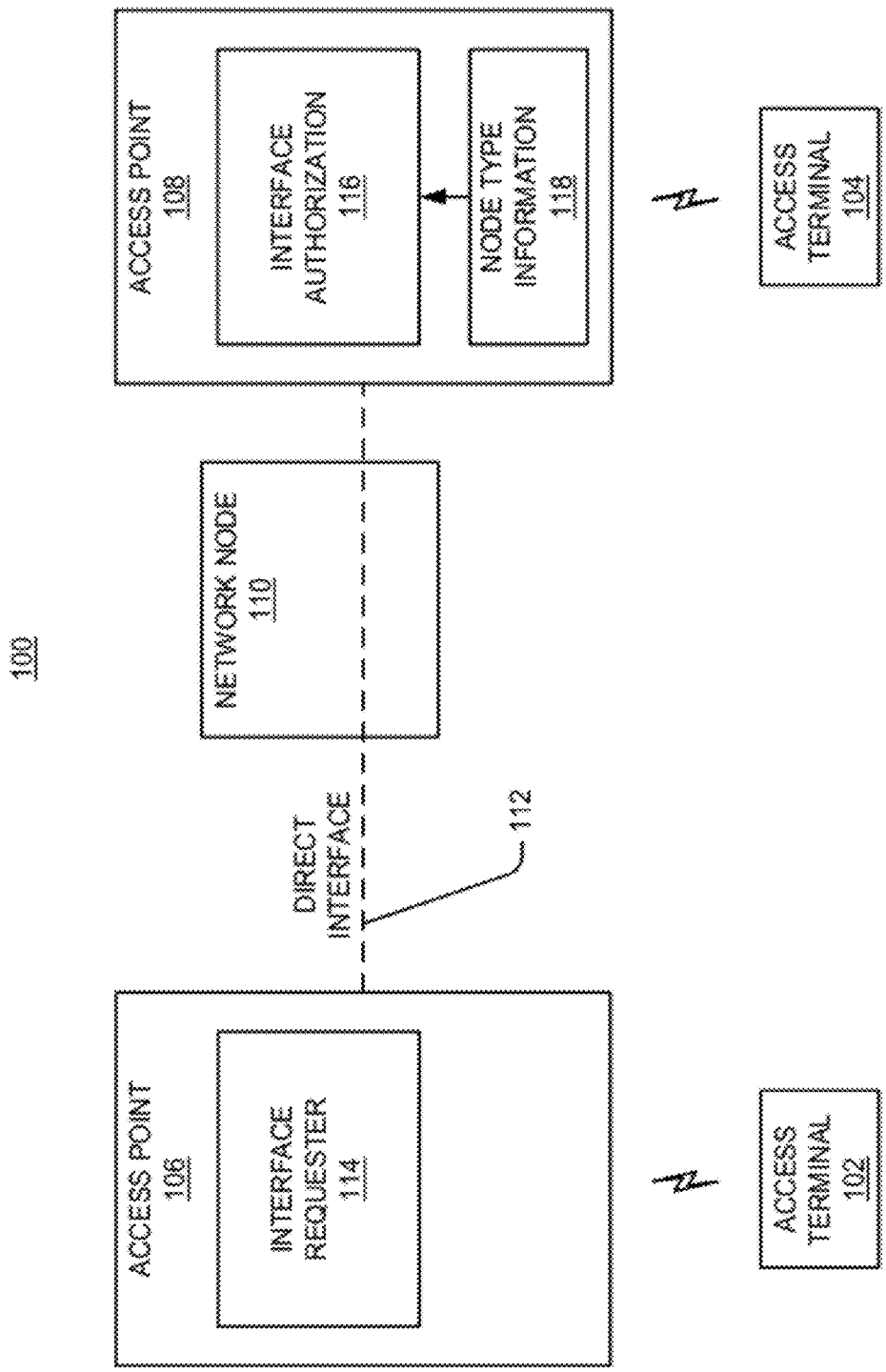
FIG. 1 is a simplified block diagram of several sample aspects of a communication system adapted to provide interface authorization.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100. For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, eNBs, HeNBs, femto nodes, and so on, while access terminals may be referred to or implemented as user equipment, mobiles, and so on.

Access points in the system 100 provide one or more services (e.g., network connectivity) for one or more wireless terminals (e.g., access terminals 102 and 104) that may be installed within or that may roam throughout a coverage area of the system 100. For example, at various points in time the access terminal 102 may connect to an access point 106, the access terminal 104 may connect to an access point 108, or the access points 102 and 104 may access some other access points in the system 100 (not shown). Each of the access points 106 and 108 may communicate with one or more network nodes (represented, for convenience, by network node 110) to facilitate wide area network connectivity. These network nodes may take various forms such as, for example, one or more radio and/or core network entities. Thus, in various implementations the network node 110 may represent functionality such as at least one of: network management (e.g., via an operation, administration, management, and provisioning entity), call control, session management, mobility management, gateway functions, interworking functions, or some other suitable network functionality.

At some point in time, it may be desirable to set up an interface between the access points 106 and 108. As used herein, the term interface refers to a logical communication channel established between entities that enables these entities to exchange information. An interface may be established to enable the access points 106 and 108 to send messages to one another to, for example, handover an access terminal, conduct neighbor relations, or perform other tasks.

An interface may take various forms in different implementations. In some aspects an interface may comprise a direct access point to access point interface. In some aspects an interface may comprise an X2 interface as defined in 3GPP LTE. As represented by the dashed line 112 in FIG. 1, in some implementations, communications via the interface may flow through the network node 110 (e.g., via the backhaul). It should be appreciated, however, that access points may communicate via an interface in other ways (e.g., via a wireless connection between access points).

In accordance with the teachings herein, an authorization scheme is employed to determine whether to establish an interface between nodes. In some aspects, a decision to allow or prohibit establishment of an interface may depend on the type (e.g., class) of one or more of the nodes for which the interface may be established. For example, establishment of an access point to access point interface (e.g., an eNB to eNB X2 interface) may be allowed/prohibited based on such a node type.

In some implementations, establishment of an interface is allowed/prohibited based on the type of a node that is attempting to initiate the connection between the nodes. For example, such a node may comprise a node that sends a request to initiate establishment of an interface to another node. In some aspects, this node may be referred to as the source for establishing the interface (e.g., the source of the request).

In some implementations, establishment of an interface is allowed/prohibited based on the type of the other node in the interface. For example, such a node may comprise the node that receives the request referenced in the previous paragraph. In some aspects, this node may be referred to as the target for establishing the interface (e.g., the target of the request).

A node type may take various forms. In some aspects, the node type relates to whether the node is a macro access point (e.g., eNB) or a femto access point (e.g., HeNB).

A sample implementation will be described with reference to the source and target terminology mentioned above. In the sample implementation, if a macro access point is the source, the establishment of the interface may be allowed irrespective of whether the target is a macro access point or a femto access point. Conversely, if a femto access point is the source, the establishment of the interface may be prohibited if the target is a macro access point and allowed if the target is a femto access point.

Through the use of such an implementation, interfaces may be established under certain circumstances to, for example, improve communication at certain nodes in a system, while interfaces may be prohibited under other circumstances to reduce the burden that would otherwise be placed on certain nodes if the interfaces were established. For example, in the sample implementation, interfaces are allowed to be established between macro access points such that macro access points may continue to reap the benefits of such interfaces as in conventional networks.

In addition, macro access points may be allowed to establish interfaces with femto access points in the sample implementation. A macro access point may elect to open such an interface with a femto access point if the macro access point needs to communicate with the femto access point. Such communication may be employed, for example, for interference management, resource allocation, and other operations.

Advantageously, the macro access point may likely have the authority and/or priority to dictate operational terms to the femto access point. However, femto access points are not allowed to open interfaces with macro access points in the sample implementation. Consequently, only a macro access point may decide whether an interface is to be opened with a femto access point, thereby enabling the macro access point to determine whether the advantage of such an interface outweighs the disadvantages of maintaining overhead associated with the interface.

Also, in the sample implementation, femto access points may establish interfaces with one another, thereby enabling femto access points to communicate directly with neighboring femto access points. Here, due to the limited transmit power of the femto access points, a given femto access point will only have a relatively small number of neighboring femto access points, in any. Consequently, scalability issues (e.g., associated with maintaining interface state information and reserving resources) may be relatively insignificant in this case.

In some implementations, a determination of whether to establish an interface between nodes is based on whether the nodes belong to a common group (i.e., the same group). For example, an interface may be allowed to be established if the nodes belong to the same group and prohibited from being established if the nodes do not belong to the same group.

As one example, a determination of whether to establish an interface between nodes may be based on whether the nodes belong to a common closed subscriber group (i.e., the same closed subscriber group). For example, an interface may be allowed to be established if the nodes belong to the same closed subscriber group and prohibited from being established if the nodes do not belong to the same closed subscriber group.

As another example, a determination of whether to establish an interface between nodes may be based on whether the nodes belong to a common enterprise (i.e., the same enterprise). For example, an interface may be allowed to be established if the nodes belong to the same enterprise (e.g., a company, a university, a government entity, and so on) and prohibited from being established if the nodes do not belong to the same enterprise.

As yet another example, a determination of whether to establish an interface between nodes may be based on whether the nodes are under a common gateway (i.e., the same gateway). For example, an interface may be allowed to be established if the nodes are under the same gateway (e.g., a femto gateway) and prohibited from being established if the nodes are not under the same gateway.

In some aspects, the determination of whether to establish an interface between nodes based on whether the nodes belong to a common group may be applied to femto access points. For example, if the source and target are both femto access points, a further test relating to whether the femto access points belong to the same group may be applied to determine whether to allow/prohibit the interface between the femto access points.

FIG. 1 illustrates, in a simplified manner, functionally of the access points 106 and 108 for authorizing the establishment of an interface as taught herein. For convenience, different functionality is illustrated in the access points 106 and 108. In practice, however, each of the access points 106 and 108 may include the functionality described herein.

The access point 106 includes functionality (e.g., an interface requester component 114) that identifies another access point (access point 108 in this example), elects to establish an interface with that access point, and sends a request to initiate establishment of the interface to that access point.

The access point 108 includes functionality (e.g., an interface authorization component 116) that receives the request, determines whether to allow the interface to be established, and sends an appropriate response to the access point 106. As discussed herein, this determination may be based on node type information 118 indicative of a type of the access point 106 and/or the access point 108.

As will be described in more detail below, interface authorization operations may be performed at the source and/or at the target. Thus, in different implementations, an interface authorization component may be employed at the access point 108 and/or the access point 106 for the case where the access point 106 sends an interface establishment request to the access point 108.

Sample operations of the system 100 will now be described in more detail in conjunction with the flowcharts of FIGS. 2 and 3. For convenience, the operations of FIGS. 2 and 3 (or any other operations discussed or taught herein) may be described as being performed by specific components (e.g., the component of FIGS. 1 and 4). It should be appreciated, however, that these operations may be performed by other types of components and may be performed using a different number of components. It also should be appreciated that one or more of the operations described herein may not be employed in a given implementation.

Figure 2:
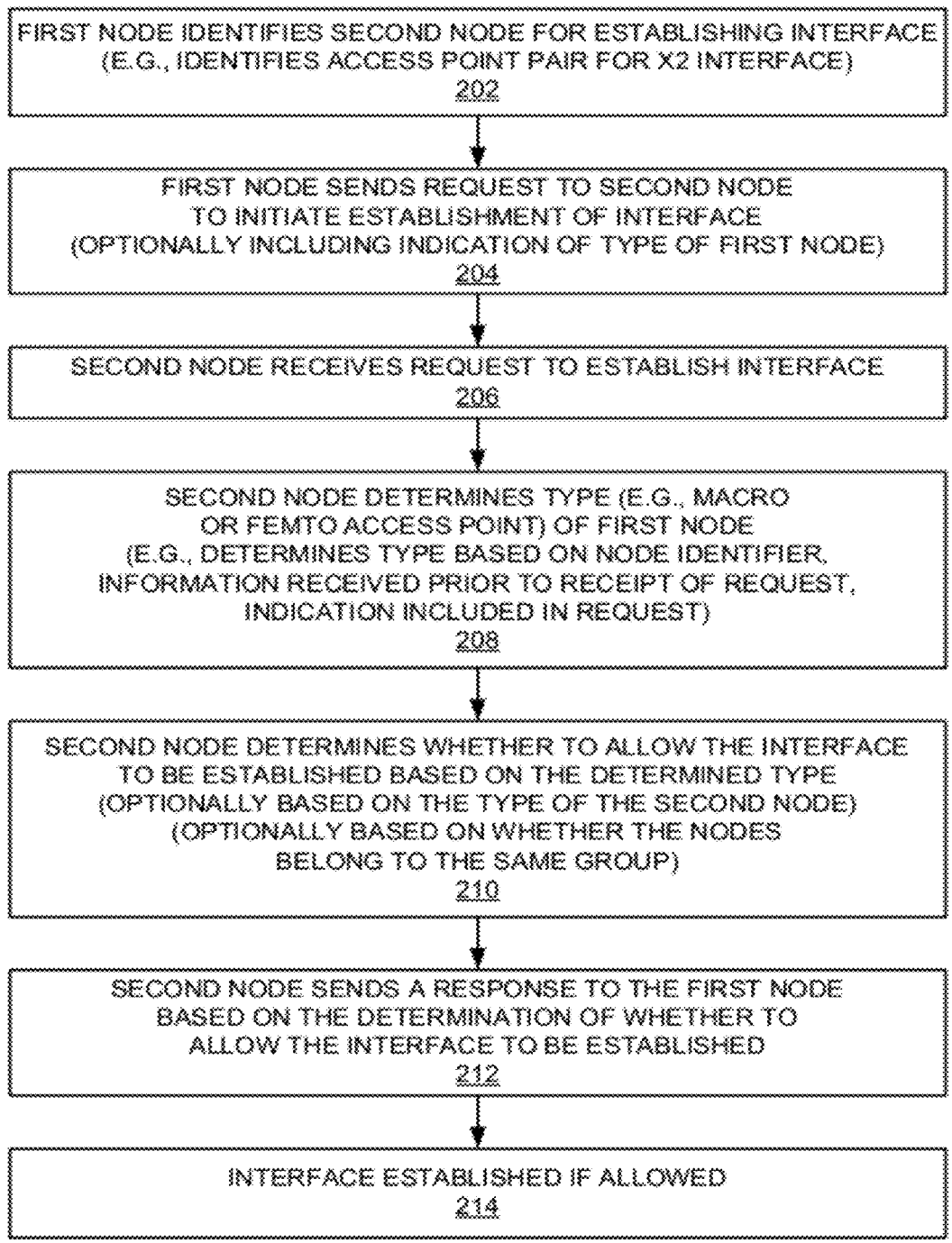
FIG. 2 is a flowchart of several sample aspects of operations that may be performed to provide interface authorization at a target node.

FIG. 2 describes sample operations that may be performed in an implementation where interface authorization is implemented at the target of an interface establishment request. For example, upon receiving a request from a source to establish an interface, the target determines whether to allow the interface to be established based on the type of one or both of these nodes.

As represented by block 202, at some point in time a first node (e.g., access point 106) identifies a second node (e.g., access point 108) for establishing an interface. For example, the first node may learn about the existence of the second node through neighbor relations, handovers, or some other suitable means. In addition, the first node may elect to establish an interface with the second node based on some criteria (e.g., relative proximity of the nodes, prior handovers, etc.). As discussed herein, in some implementations the interface may comprise an X2 interface.

As represented by block 204, the first node thus sends a request (e.g., an X2 initiation request) to the second node to initiate the establishment of an interface. In some implementations, this request may include an indication of the type of the first node (e.g., macro access point or femto access point). The second node receives this request at block 206.

As represented by block 208, the second node determines the type of the first node. This may be accomplished in various ways. In some cases, the type is determined based on an identifier of the first node (e.g., a network may assign certain access point identifiers to certain types of access points). As discussed above, in some cases the first access point sends an indication of its type in the request. In some cases, the type is determined based on information that the second node receives about the first node prior to the second node receiving the request. For example, in conjunction with conducting neighbor relations, the second node may acquire type information about the first node.

As represented by block 210, the second node determines whether to allow the interface to be established based on the type determined at block 208. For example, the request may be allowed if the first node is a macro access point.

In addition, as discussed herein, the determination of whether to allow the interface to be established may be based on the type of the second node (e.g., instead of or in addition to the type of the first node). For example, the request may be rejected if the first node is a femto access point and the second node is a macro access point.

Also as discussed herein in some cases, the determination of whether to allow the interface to be established also may be based on whether the nodes belong to the same group. For example, if both nodes are femto access points, the second node may elect to only allow the interface to be established if both nodes also belong to the same group. As discussed herein, such a group may relate to at least one of: a CSG, an enterprise, or a gateway.

As represented by block 212, the second node sends a response to the first node based on the determination of block 210. For example, the second node may send an indication that it accepts or rejects the request sent at block 204.

As represented by block 214, in the event the establishment of the interface is authorized, the first and second node will cooperate to establish the connection. The first and second nodes may then communicate directly with one another via this interface.

Figure 3:
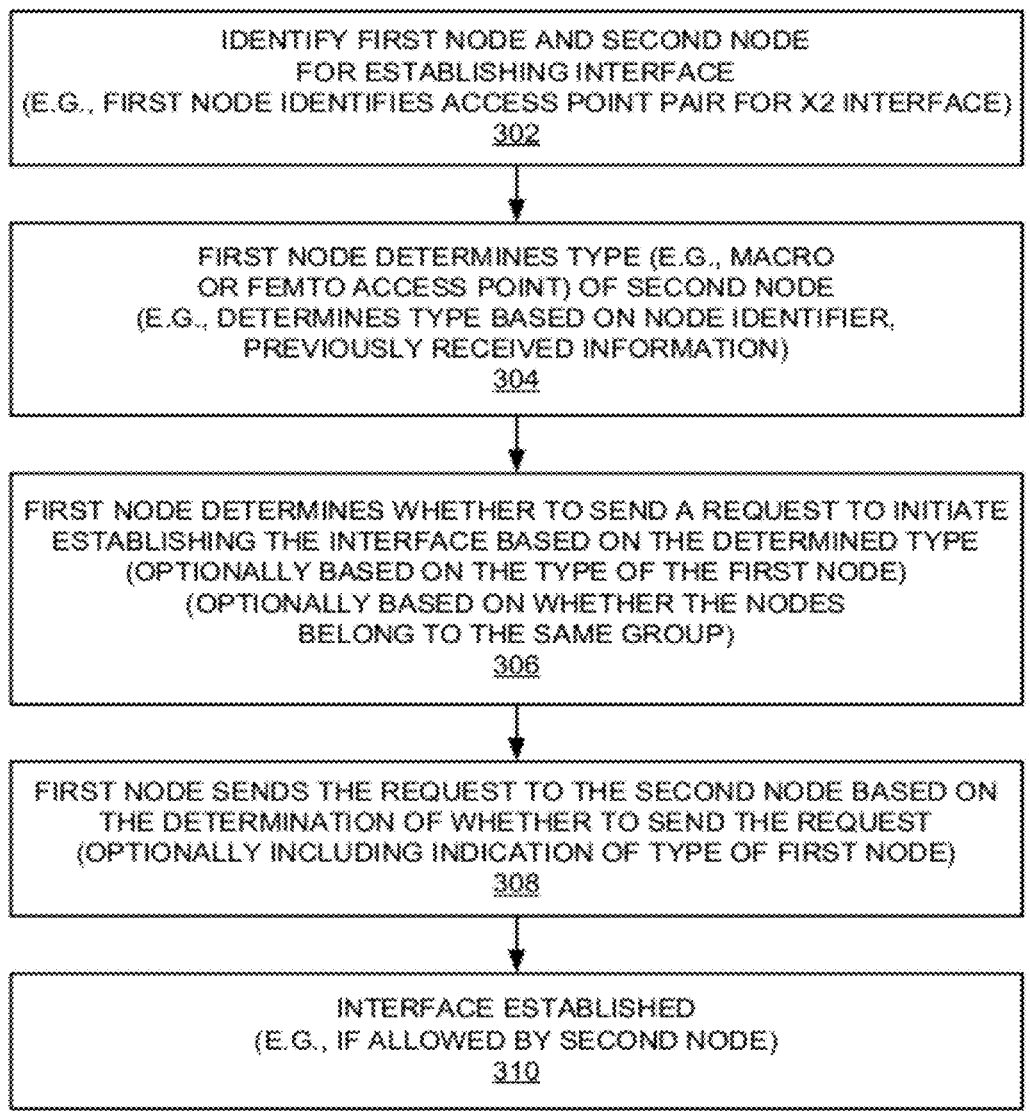
FIG. 3 is a flowchart of several sample aspects of operations that may be performed to provide interface authorization at a source node.

FIG. 3 describes sample operations that may be performed in an implementation where interface authorization is implemented at the source of an interface establishment request. For example, upon identifying a target for establishing an interface, the source determines whether to send a request to the target to establish an interface based on the type of one or both of these nodes.

As represented by block 302, at some point in time a first node (e.g., access point 106) identifies a second node (e.g., access point 108) with which the first node may establish an interface. For example, as discussed above, the first node may learn about the existence of the second node in some manner and then elect to establish an interface with the second node based on some criteria. Again, in some implementations the interface may comprise an X2 interface.

As represented by block 304, the first node then determines the type of the second node. This may be accomplished in various ways. In some cases, the type is determined based on an identifier of the second node (e.g., a network may assign certain access point identifiers to certain types of nodes). In some cases, the type is determined based on information that the first node receives about the second node prior to identifying the second node for establishing an interface. For example, in conjunction with conducting neighbor relations, the first node may acquire type information about the second node.

As represented by block 306, the second node determines whether to send a request to the second node to initiate establishing the interface based on the type determined at block 304. For example, the request may be allowed if the second node is a femto access point.

In addition, as discussed herein, the determination of whether to allow the interface to be established may be based on the type of the first node (e.g., instead of or in addition to the type of the second node). For example, the request may be rejected if the first node is a femto access point and the second node is a macro access point.

Also, the determination of whether to allow the interface to be established may be based on whether the nodes belong to the same group. For example, if both nodes are femto access points, the first node may elect to send the request only if both nodes belong to the same group. As discussed herein, such a group may relate to at least one of: a CSG, an enterprise, or a gateway.

As represented by block 308, the first node may then send the request to the second node based on the determination of block 306. As discussed above, in some cases this request may include the type of the first node.

As represented by block 310, the interface may then be established, as appropriate. For example, in implementations where the second node also performs interface authorization as taught herein or performs some other interface control, the interface may be established if the second node agrees to establish the interface with the first node.

Figure 4:
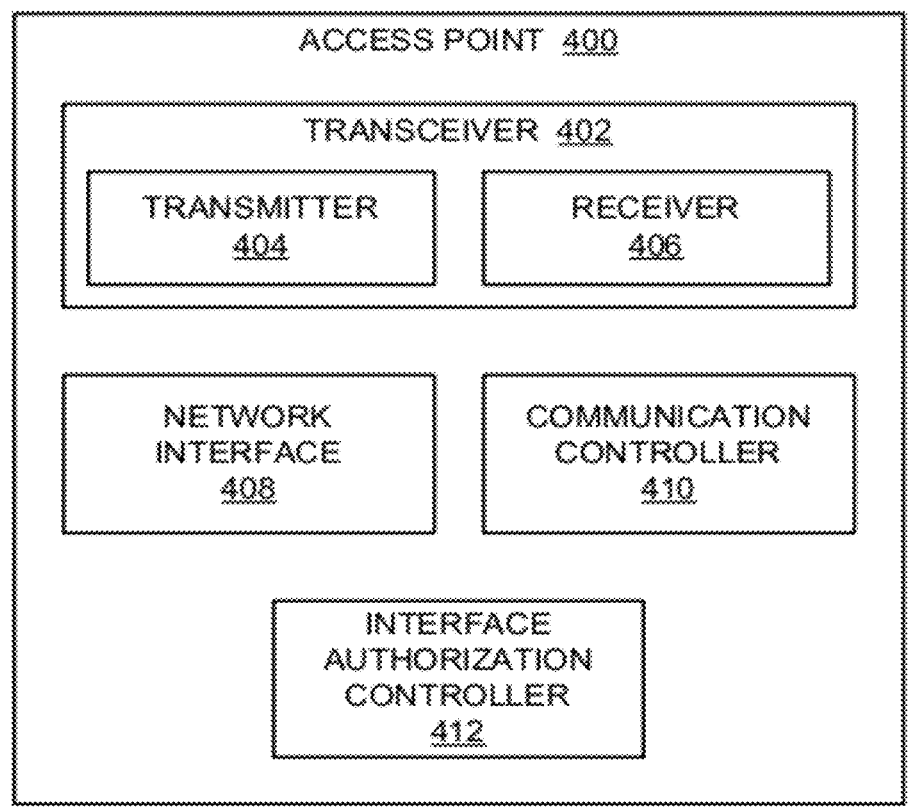
FIG. 4 is a simplified block diagram of several sample aspects of components that may be employed in communication nodes.

FIG. 4 illustrates several sample components that may be incorporated into nodes such as an access point 400 to perform interface authorization operations as taught herein. The described components also may be incorporated into other nodes in a communication system. For example, other nodes in a system may include components similar to those described for the access point 400 to provide similar functionality. A given node may contain one or more of the described components. For example, an access point may contain multiple transceiver components that enable the access point to operate on multiple frequencies and/or communicate via different technologies.

As shown in FIG. 4, the access point 400 may include a transceiver 402 for communicating with other nodes. The transceiver 402 includes a transmitter 404 for sending signals (e.g., interface authorization messages) and a receiver 406 for receiving signals. The access point 400 also includes a network interface 408 for communicating with other nodes (e.g., other network nodes). For example, the network interface 408 may be configured to communicate with one or more network nodes via a wired or wireless backhaul.

The access point 400 also includes other components that may be used in conjunction with interface authorization operations as taught herein. For example, the access point 400 may include a communication controller 410 for managing communication with other nodes (e.g., sending and receiving requests, messages, and indications) and for providing other related functionality as taught herein. In addition, the access point 400 may include an interface authorization controller (e.g., corresponding to component 116 of FIG. 1 and/or a similar component implemented in access point 106) for controlling the establishment of interfaces (e.g., determining node type, determining whether to allow an interface to be established, identifying one or more nodes for establishing an interface, determining whether to send a request to initiate establishing an interface) and for providing other related functionality as taught herein.

For convenience, the access point 400 is shown in FIG. 4 as including components that may be used in the various examples described herein. In practice, one or more of the illustrated components may be implemented in different ways in different implementations. As an example, the access point 400 may have different functionality and/or operate in a different manner (e.g., interface authorization is performed in a different manner) in the implementation of FIG. 2 as compared to the implementation of FIG. 3.

Also, in some implementations the components of FIG. 4 may be implemented in one or more processors (e.g., each of which uses and/or incorporates data memory). For example, the functionality of blocks 410 and 412 may be implemented by a processor or processors of an access point In some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., divided into) one or more cells or sectors. A cell or sector associated with a macro access point, a femto access point, or a pico access point may be referred to as a macro cell, a femto cell, or a pico cell, respectively.

Figure 5:
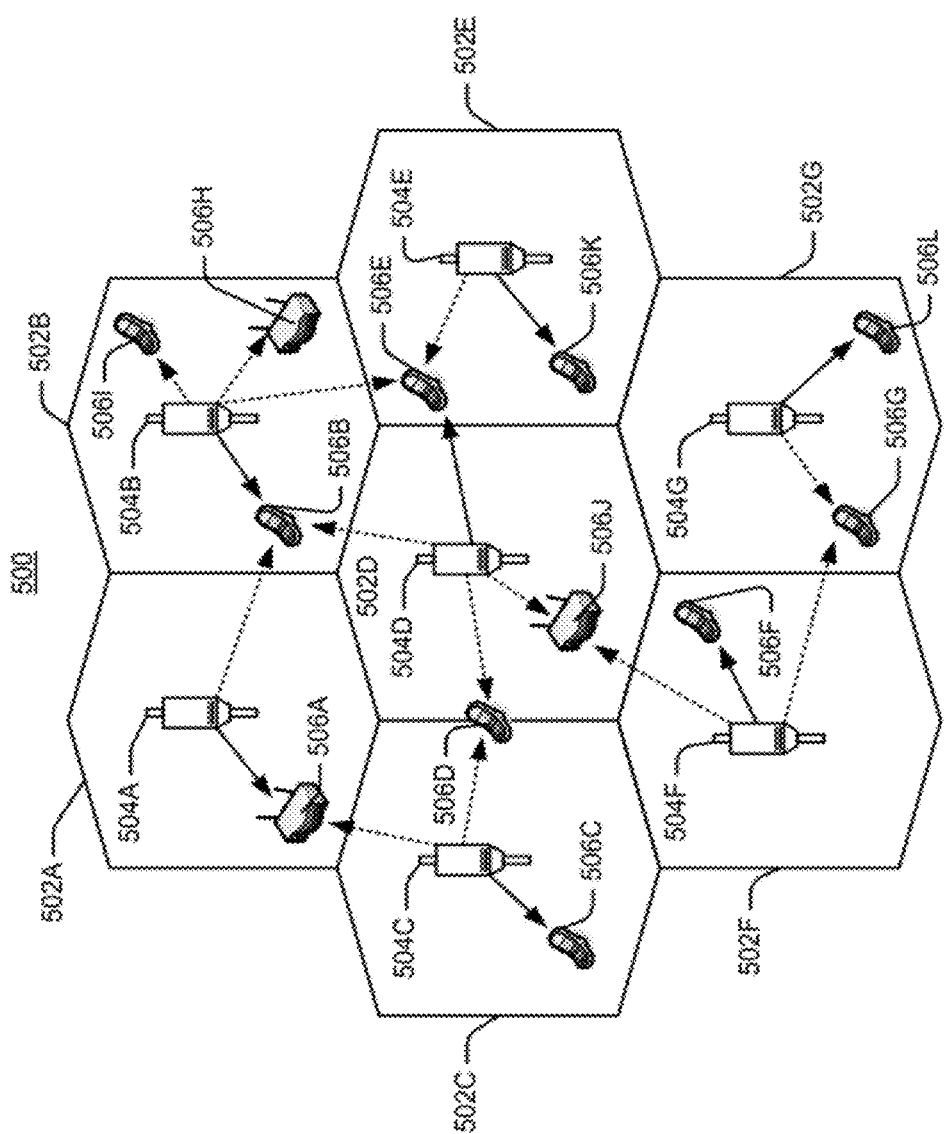
FIG. 5 is a simplified diagram of a wireless communication system.

FIG. 5 illustrates a wireless communication system 500, configured to support a number of users, in which the teachings herein may be implemented. The system 500 provides communication for multiple cells 502, such as, for example, macro cells 502A-502G, with each cell being serviced by a corresponding access point 504 (e.g., access points 504A-504G). As shown in FIG. 5, access terminals 506 (e.g., access terminals 506A-506L) may be dispersed at various locations throughout the system over time. Each access terminal 506 may communicate with one or more access points 504 on a forward link (FL) and/or a reverse link (RL) at a given moment, depending upon whether the access terminal 506 is active and whether it is in soft handoff, for example. The wireless communication system 500 may provide service over a large geographic region. For example, macro cells 502A-502G may cover a few blocks in a neighborhood or several miles in rural environment.

Figure 6:
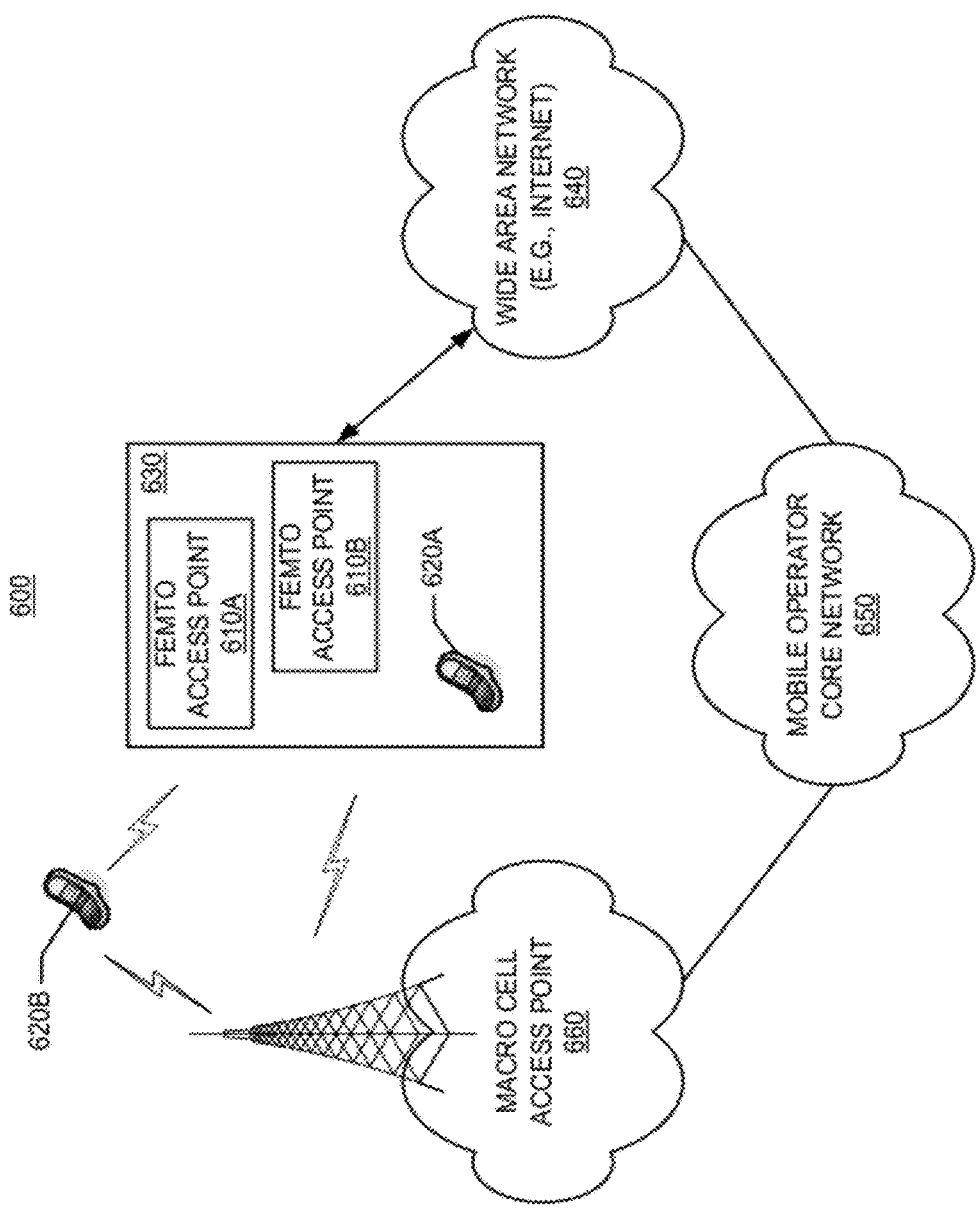
FIG. 6 is a simplified diagram of a wireless communication system including femto nodes.

FIG. 6 illustrates an exemplary communication system 600 where one or more femto access points are deployed within a network environment. Specifically, the system 600 includes multiple femto access points 610 (e.g., femto access points 610A and 610B) installed in a relatively small scale network environment (e.g., in one or more user residences 630). Each femto access point 610 may be coupled to a wide area network 640 (e.g., the Internet) and a mobile operator core network 650 via a DSL router, a cable modem, a wireless link, or other connectivity means (not shown). As will be discussed below, each femto access point 610 may be configured to serve associated access terminals 620 (e.g., access terminal 620A) and, optionally, other (e.g., hybrid or alien) access terminals 620 (e.g., access terminal 620B). In other words, access to femto access points 610 may be restricted whereby a given access terminal 620 may be served by a set of designated (e.g., home) femto access point(s) 610 but may not be served by any non-designated femto access points 610 (e.g., a neighbor's femto access point 610).

Figure 7:
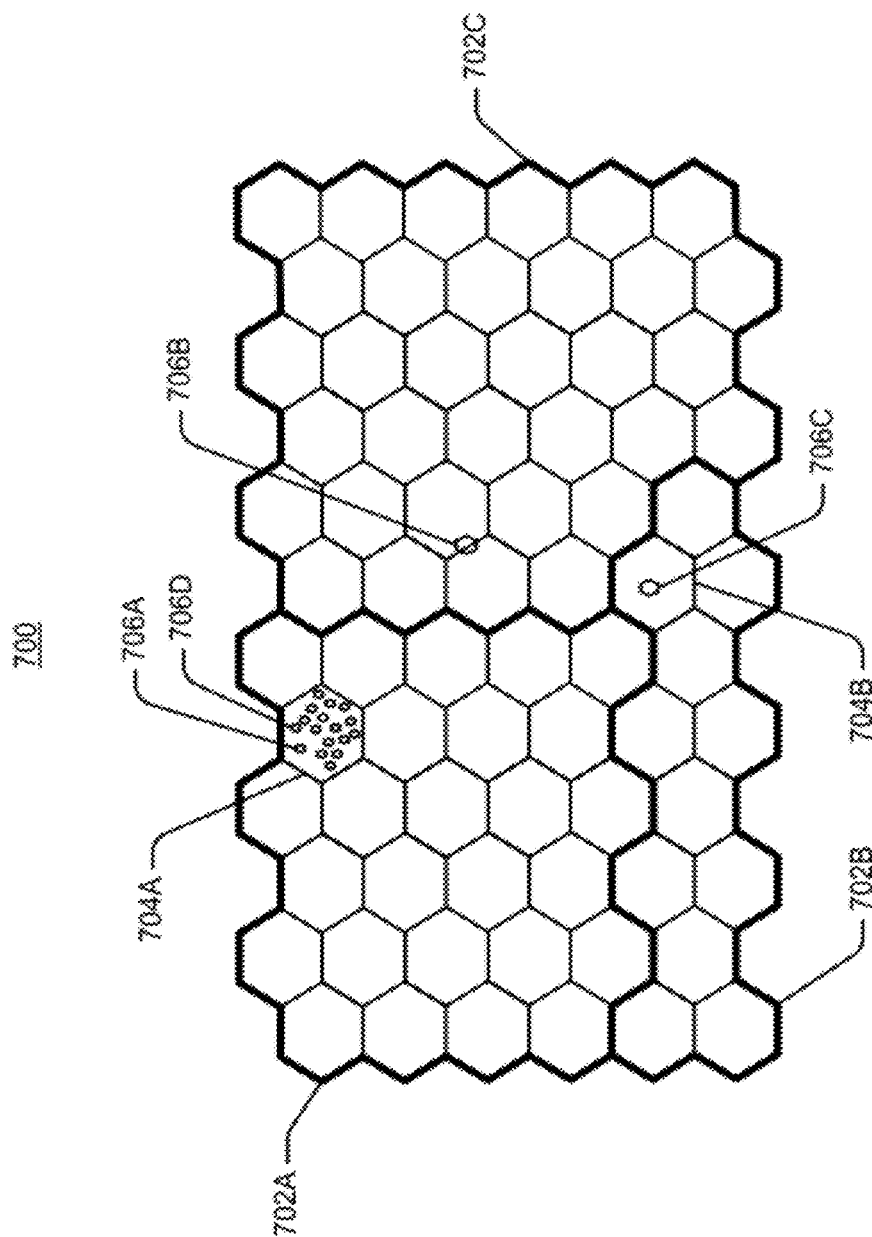
FIG. 7 is a simplified diagram illustrating coverage areas for wireless communication.

FIG. 7 illustrates an example of a coverage map 700 where several tracking areas 702 (or routing areas or location areas) are defined, each of which includes several macro coverage areas 704. Here, areas of coverage associated with tracking areas 702A, 702B, and 702C are delineated by the wide lines and the macro coverage areas 704 are represented by the larger hexagons. The tracking areas 702 also include femto coverage areas 706. In this example, each of the femto coverage areas 706 (e.g., femto coverage area 706C) is depicted within one or more macro coverage areas 704 (e.g., macro coverage area 704B). It should be appreciated, however, that some or all of a femto coverage area 706 may not lie within a macro coverage area 704. In practice, a large number of femto coverage areas 706 may be defined with a given tracking area 702 or macro coverage area 704. Also, one or more pico coverage areas (not shown) may be defined within a given tracking area 702 or macro coverage area 704.

Referring again to FIG. 6, the owner of a femto access point 610 may subscribe to mobile service, such as, for example, 3G mobile service, offered through the mobile operator core network 650. In addition, an access terminal 620 may be capable of operating both in macro environments and in smaller scale (e.g., residential) network environments. In other words, depending on the current location of the access terminal 620, the access terminal 620 may be served by a macro cell access point 660 associated with the mobile operator core network 650 or by any one of a set of femto access points 610 (e.g., the femto access points 610A and 610B that reside within a corresponding user residence 630). For example, when a subscriber is outside his home, he is served by a standard macro access point (e.g., access point 660) and when the subscriber is at home, he is served by a femto access point (e.g., access point 610A). Here, a femto access point 610 may be backward compatible with legacy access terminals 620.

A femto access point 610 may be deployed on a single frequency or, in the alternative, on multiple frequencies. Depending on the particular configuration, the single frequency or one or more of the multiple frequencies may overlap with one or more frequencies used by a macro access point (e.g., access point 660).

In some aspects, an access terminal 620 may be configured to connect to a preferred femto access point (e.g., the home femto access point of the access terminal 620) whenever such connectivity is possible. For example, whenever the access terminal 620A is within the user's residence 630, it may be desired that the access terminal 620A communicate only with the home femto access point 610A or 610B.

In some aspects, if the access terminal 620 operates within the macro cellular network 650 but is not residing on its most preferred network (e.g., as defined in a preferred roaming list), the access terminal 620 may continue to search for the most preferred network (e.g., the preferred femto access point 610) using a better system reselection (BSR) procedure, which may involve a periodic scanning of available systems to determine whether better systems are currently available and subsequently acquire such preferred systems. The access terminal 620 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 610, the access terminal 620 selects the femto access point 610 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 610 that reside within the corresponding user residence 630). In some implementations, an access point may be restricted to not provide, for at least one node, at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A guest (or hybrid) femto access point may refer to a femto access point on which an access terminal is temporarily authorized to access or operate on. An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 8:
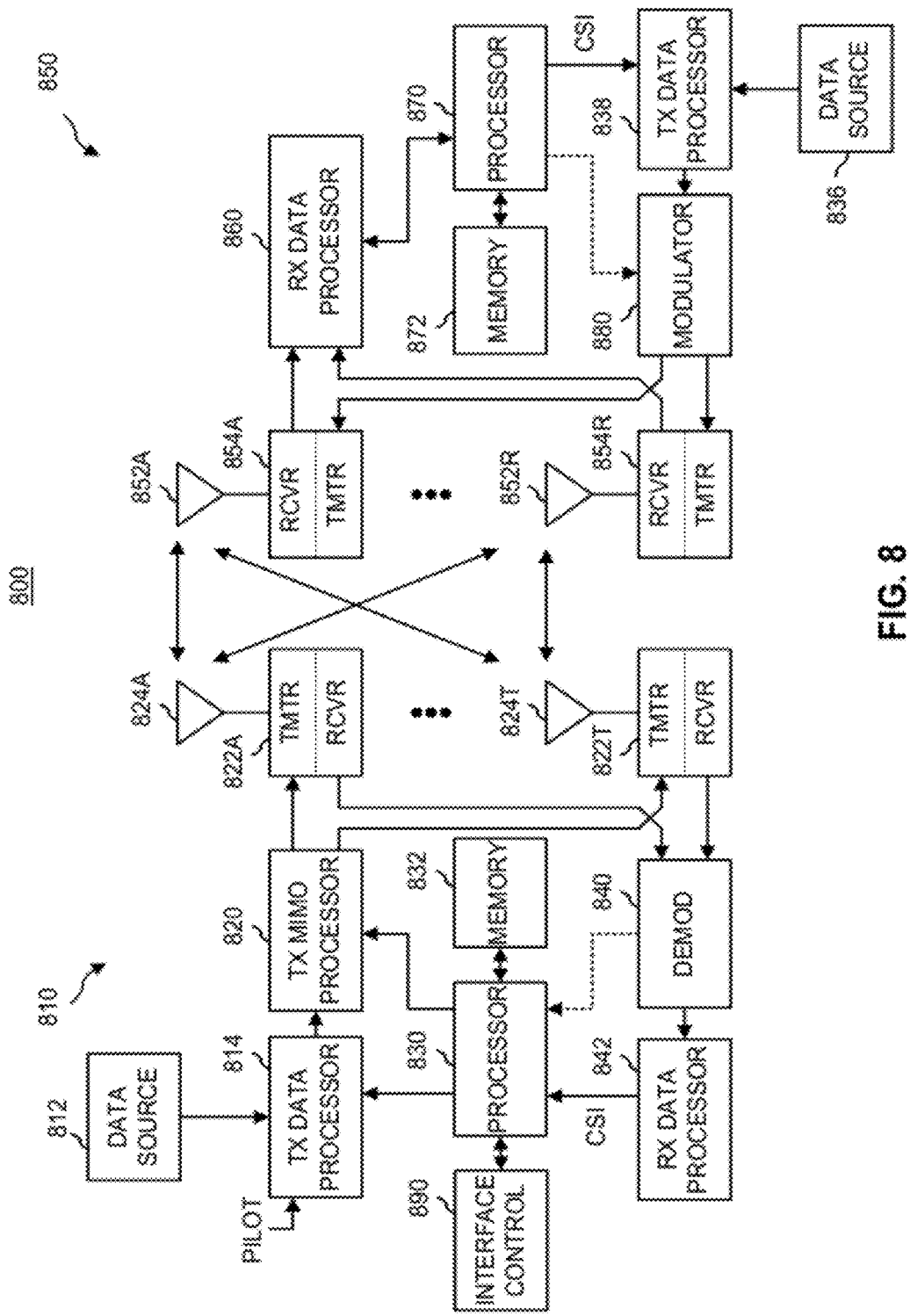
FIG. 8 is a simplified block diagram of several sample aspects of communication components.

FIG. 8 illustrates a wireless device 810 (e.g., an access point) and a wireless device 850 (e.g., an access terminal) of a sample MIMO system 800. At the device 810, traffic data for a number of data streams is provided from a data source 812 to a transmit (TX) data processor 814. Each data stream may then be transmitted over a respective transmit antenna.

The TX data processor 814 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 830. A data memory 832 may store program code, data, and other information used by the processor 830 or other components of the device 810.

The modulation symbols for all data streams are then provided to a TX MIMO processor 820, which may further process the modulation symbols (e.g., for OFDM). The TX MIMO processor 820 then provides $N_T$ modulation symbol streams to NT transceivers (XCVR) 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver (XCVR) 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive (RX) data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which pre-coding matrix to use (discussed below). The processor 870 formulates a reverse link message comprising a matrix index portion and a rank value portion. A data memory 872 may store program code, data, and other information used by the processor 870 or other components of the device 850.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator (DEMOD) 840, and processed by a RX data processor 842 to extract the reverse link message transmitted by the device 850. The processor 830 then determines which pre-coding matrix to use for determining the beam-forming weights then processes the extracted message.

FIG. 8 also illustrates that the communication components may include one or more components that perform interface control operations as taught herein. For example, an interface control component 890 may cooperate with the processor 830 and/or other components of the device 810 to establish an interface with another device as taught herein. It should be appreciated that for each device 810 and 850 the functionality of two or more of the described components may be provided by a single component. For example, a single processing component may provide the functionality of the interface control component 890 and the processor 830.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 9:
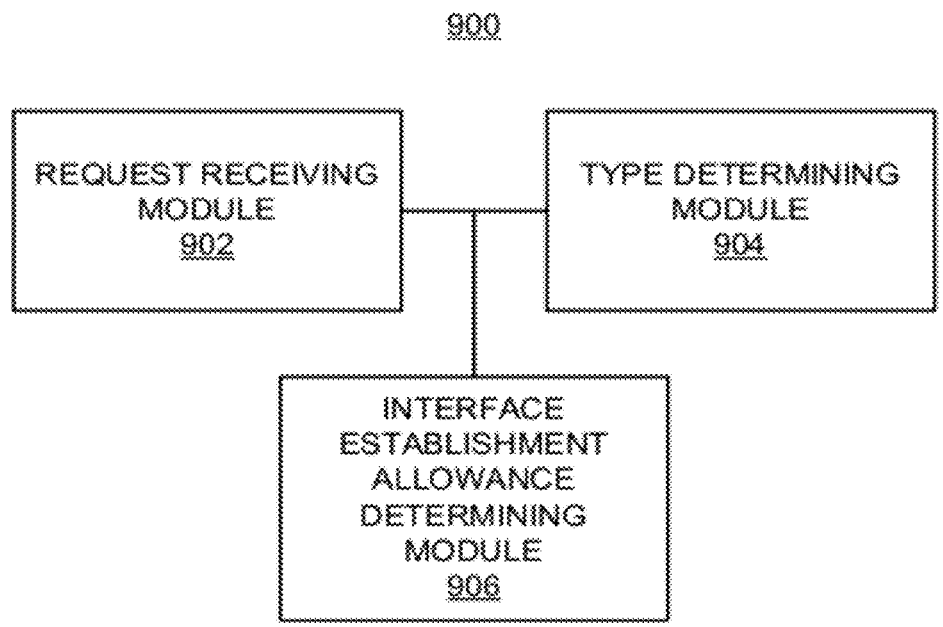
FIGS. 9 and 10 are simplified block diagrams of several sample aspects of apparatuses configured to provide interface authorization as taught herein.
Figure 10:
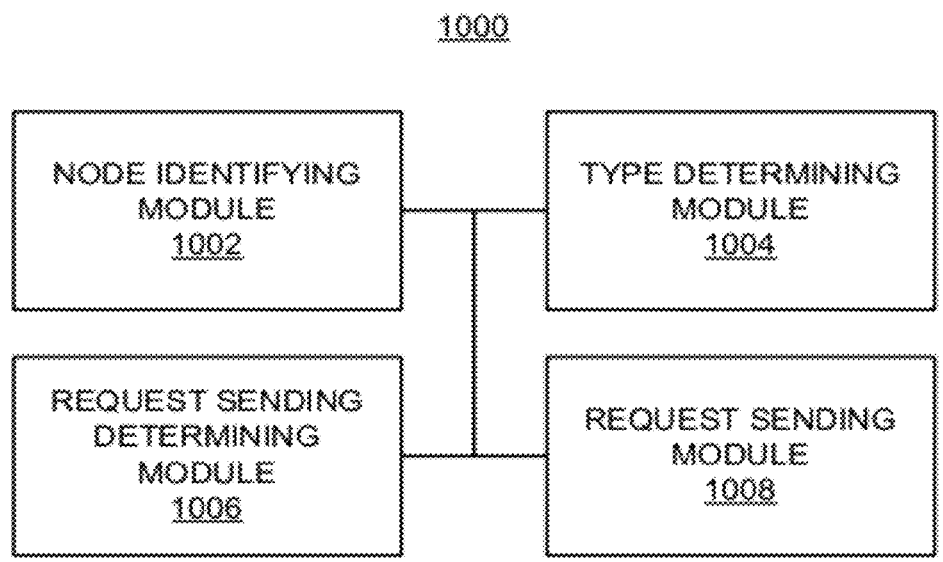

The functionality described herein (e.g., with regard to one or more of the accompanying figures) may correspond in some aspects to similarly designated "means for" functionality in the appended claims. Referring to FIGS. 9 and 10, apparatuses 900 and 1000 are represented as a series of interrelated functional modules. Here, a request receiving module 902 may correspond at least in some aspects to, for example, a communication controller as discussed herein. A type determining module 904 may correspond at least in some aspects to, for example, an interface authorization controller as discussed herein. An interface establishment allowance determining module 906 may correspond at least in some aspects to, for example, an interface authorization controller as discussed herein. A node identifying module 1002 may correspond at least in some aspects to, for example, an interface authorization controller as discussed herein. A type determining module 1004 may correspond at least in some aspects to, for example, an interface authorization controller as discussed herein. A request sending determining module 1006 may correspond at least in some aspects to, for example, an interface authorization controller as discussed herein. A request sending module 1008 may correspond at least in some aspects to, for example, a communication controller as discussed herein.

The functionality of the modules of FIGS. 9 and 10 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof The functionality of these modules also may be implemented in some other manner as taught herein. In some aspects one or more of any dashed blocks in FIGS. 9 and 10 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
    identifying a first base station and a second base station for establishing an interface;
    determining a type of the second base station;
    determining whether to transmit a request to initiate establishing the interface based at least in part on the type of the second base station and a type of the first base station; and
    transmitting the request to the second base station based on the determination of whether to transmit the request.

2. The method of claim 1, wherein the determination of whether to transmit the request is further based on whether the type of the second base station is a macro access point or a femto access point.

3. The method of claim 1, wherein the request is transmitted if the type of the first base station is a macro access point and the type of the second base station is a macro access point.

4. The method of claim 1, wherein the request is transmitted if the type of the first base station is a macro access point and the type of the second base station is a femto access point.

5. The method of claim 1, wherein the request is not transmitted if the type of the first base station is a femto access point and the type of the second base station is a macro access point.

6. The method of claim 1, wherein the request is transmitted if the type of the first node base station is a femto access point and the type of the second base station is a femto access point.

7. The method of claim 1, wherein the determination of whether to transmit the request comprises determining whether the first base station and the second base station belong to a common group.

8. The method of claim 7, wherein the determination of whether the first base station and the second base station belong to the common group comprises determining whether the first base station and the second base station belong to a common closed subscriber group.

9. The method of claim 7, wherein the determination of whether the first base station and the second base station belong to the common group comprises determining whether the first base station and the second base station belong to a common enterprise.

10. The method of claim 7, wherein the determination of whether the first base station and the second base station belong to the common group comprises determining whether the first base station and the second base station are under a common gateway.

11. The method of claim 1, wherein the determination of the type is based on one or more of an identifier of the second base station, information obtained about the second base station before the identification of the second base station, or a combination thereof 12. The method of claim 1, wherein the interface comprises a direct access point to access point interface.

13. The method of claim 1, wherein the interface comprises an X2 interface.

14. The method of claim 1, wherein the request comprises a CSG indicator associated with one or more of the first base station or second base station.

15. The method of claim 1, wherein the determination of whether to transmit the request comprises determining whether the second base station is associated with a CSG.

16. The method of claim 15, further comprising transmitting a handover request to the second base station, the handover request corresponding to a UE that is associated with the CSG and served by the first base station.

17. An apparatus for communication, comprising:
    an interface authorization controller, the interface authorization controller being configured:
        to identify a first base station and a second base station for establishing an interface,
        to determine a type of the second base station, and
        to determine whether to transmit a request to initiate establishing the interface based at least in part on the type of the second base station and a type of the first base station; and
    a communication controller configured to transmit the request to the second base station based on the determination of whether to transmit the request.

18. The apparatus of claim 17, wherein the determination of whether to transmit the request is further based on whether the type of the second base station is a macro access point or a femto access point.

19. The apparatus of claim 17, wherein the determination of whether to transmit the request comprises determining whether the first base station and the second base station belong to a common group.

20. The apparatus of claim 17, wherein the interface comprises an X2 interface.

21. The apparatus of claim 17, wherein the request comprises a CSG indicator associated with one or more of the first base station or second base station.

22. The apparatus of claim 17, wherein the interface authorization controller determines whether to transmit the request further based on whether the second base station is associated with a CSG.

23. An apparatus for communication, comprising:
    means for identifying a first base station and a second base station for establishing an interface;
    means for determining a type of the second base station;
    means for determining whether to transmit a request to initiate establishing the interface based at least in part on the type of the second base station and a type of the first base station; and
    means for transmitting the request to the second base station based on the determination of whether to transmit the request.

24. The apparatus of claim 23, wherein the determination of whether to transmit the request is further based on whether the type of the second node is a macro access point or a femto access point.

25. The apparatus of claim 23, wherein the determination of whether to transmit the request comprises determining whether the first base station and the second base station belong to a common group.

26. The apparatus of claim 23, wherein the interface comprises an X2 interface.

27. The apparatus of claim 23, wherein the request comprises a CSG indicator associated with one or more of the first base station or second base station.

28. The apparatus of claim 23, wherein the means for determining whether to transmit the request further determines whether to transmit the request based on whether the second base station is associated with a CSG.

29. A computer-program product, comprising:
a non-transitory computer-readable medium having non-transitory program code recorded thereon, the program code comprising:
program code to identify a first base station and a second base station for establishing an interface;
program code to determine a type of the second base station;
program code to determine whether to transmit a request to initiate establishing the interface based at least in part on the type of the second base station and a type of the first base station; and
program code to transmit the request to the second base station based on the determination of whether to transmit the request.

30. The computer-program product of claim 29, further comprising program code to determine whether to transmit the request based on whether the type of the second base station is a macro access point or a femto access point.

31. The computer-program product of claim 29, further comprising program code to determine whether to transmit the request based on whether the first base station and the second base station belong to a common group.

32. The computer-program product of claim 29, wherein the interface comprises an X2 interface.

33. The computer-program product of claim 29, wherein the request comprises a CSG indicator associated with one or more of the first base station or second base station.

34. The computer-program product of claim 29, further comprising program code to determine whether to transmit the request based on whether the second base station is associated with a CSG.

* * * * *